(12) United States Patent
Shafer et al.

(10) Patent No.: US 10,433,036 B1
(45) Date of Patent: Oct. 1, 2019

(54) DATA LOGGER SYSTEM AND RELATED METHODS

(71) Applicant: Arizona Board of Regents, Flagstaff, AZ (US)

(72) Inventors: Michael Shafer, Flagstaff, AZ (US); Paul Flikkema, Flagstaff, AZ (US); Charles Loren Buck, Flagstaff, AZ (US); Austin Rhodes, Flagstaff, AZ (US)

(73) Assignee: Arizona Board of Regents, Flagstaff, AZ (US)

( * ) Notice: Subject to any disclaimer, the term of this patent is extended or adjusted under 35 U.S.C. 154(b) by 0 days.

(21) Appl. No.: 15/851,483

(22) Filed: Dec. 21, 2017

Related U.S. Application Data

(60) Provisional application No. 62/437,580, filed on Dec. 21, 2016.

(51) Int. Cl.
*H04Q 9/02* (2006.01)

(52) U.S. Cl.
CPC ........... *H04Q 9/02* (2013.01); *H04Q 2209/40* (2013.01); *H04Q 2209/886* (2013.01)

(58) Field of Classification Search
CPC . H04Q 9/02; H04Q 2209/40; H04Q 2209/886
See application file for complete search history.

(56) References Cited

U.S. PATENT DOCUMENTS

| | | | |
|---|---|---|---|
| 5,502,656 A * | 3/1996 | Fulcher | A01K 79/00 700/73 |
| 7,081,693 B2 | 7/2006 | Hamel et al. | |
| 7,118,531 B2 * | 10/2006 | Krill | A61B 1/041 600/309 |
| 7,272,730 B1 * | 9/2007 | Acquaviva | G06F 1/3203 713/300 |
| 7,411,512 B2 | 8/2008 | Domeier | |
| 8,386,008 B2 | 2/2013 | Yuen et al. | |
| 8,866,605 B2 | 10/2014 | Gibson | |
| 2008/0262562 A1 * | 10/2008 | Roberts | A61N 1/3785 607/35 |
| 2009/0070630 A1 * | 3/2009 | Khatri | G06F 11/073 714/37 |
| 2012/0116590 A1 * | 5/2012 | Florez-Larrahondo | G06F 1/206 700/275 |
| 2015/0253414 A1 * | 9/2015 | Chan | G01S 5/30 600/485 |
| 2016/0111980 A1 * | 4/2016 | Sun | H02N 2/185 310/339 |
| 2017/0123857 A1 * | 5/2017 | Khan | G06F 8/451 |

* cited by examiner

*Primary Examiner* — Amine Benlagsir
(74) *Attorney, Agent, or Firm* — Adam R. Stephenson, Ltd.

(57) ABSTRACT

Implementations of data logger systems may include: a data logger coupled with an energy storage device. The data logger may be configured to couple to a living subject and record data related to one of the living subject's activities and a vital parameter of the living subject. The data logger system may also include an energy harvester electrically coupled with the energy storage device, where the energy harvester is configured to harvest energy from one of an external environment, the living subject, and both the external environment and the subject. The data logger may be configured to communicate with a remote communication system.

16 Claims, 5 Drawing Sheets

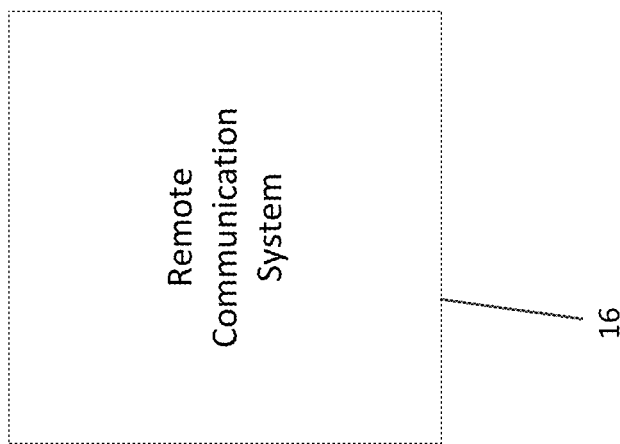
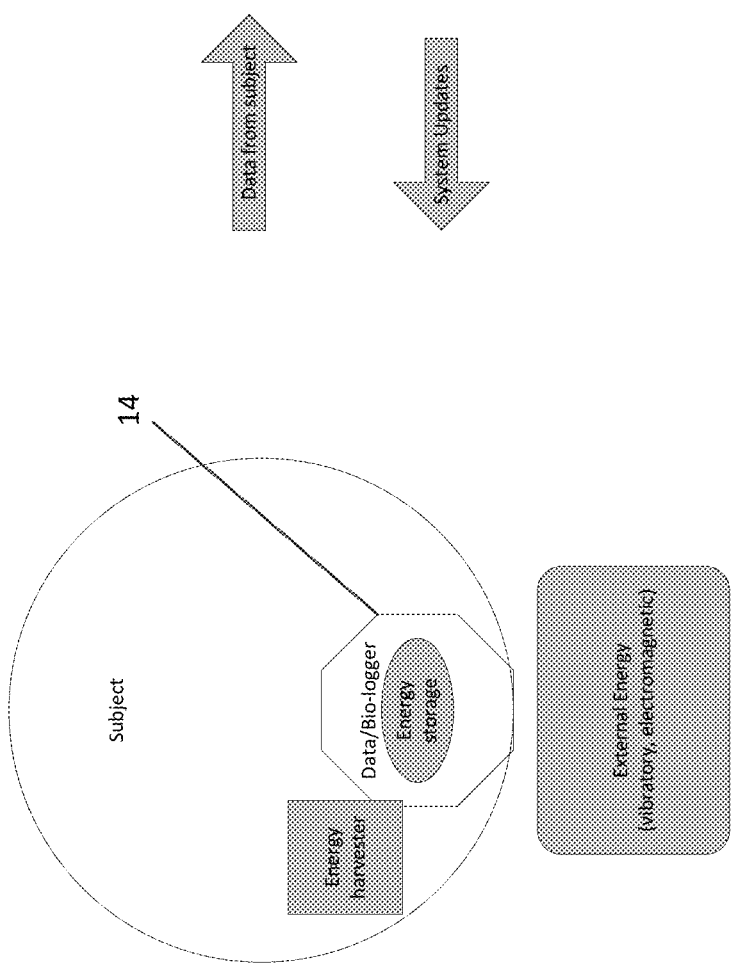
FIG. 2

DATA LOGGER SYSTEM AND RELATED METHODS

CROSS REFERENCE TO RELATED APPLICATIONS

This document claims the benefit of the filing date of U.S. Provisional Patent Application 62/437,580, entitled "Advanced Implantable Data Logger" to Michael Shafer et al. which was filed on Dec. 21, 2016, the disclosure of which is hereby incorporated entirely herein by reference.

BACKGROUND

1. Technical Field

Aspects of this document relate generally to data loggers, such as devices for tracking living subjects. More specific implementations involve location trackers and biological activity trackers.

2. Background

Data logging devices use a sensor to collect information and then store data summarizing that information in the device. Some data logging devices are fixedly mounting at specific locations, like data sensors on process chemical equipment. Other data loggers are found and retrieved by the experimenters who have attached to a movable subject, like an animal.

SUMMARY

Implementations of data logger systems may include: a data logger coupled with an energy storage device. The data logger may be configured to couple to a living subject and record data related to the living subject's activities or a vital parameter of the living subject. The data logger system may also include an energy harvester electrically coupled with the energy storage device, where the energy harvester is configured to harvest energy from an external environment, the living subject, or both the external environment and the subject. The data logger may be configured to communicate with a remote communication system.

Implementations of a data logger may include one, all, or any of the following:

The data logger may be implantable or ingestible.

The data logger may communicate with the remote communication system through electromagnetic signals including radio communication, vibratory signals, or visible and invisible light.

The data logger may communicate with the remote communication system through acoustic signals.

The energy harvester may harvest energy from electromagnetic fields, pressure differences, or vibratory power transfer.

The energy harvester may be a piezoelectric resonator.

The energy storage device may be a lead-acid battery, a lithium ion battery, or a lithium ion capacitor.

The data logger system may also include a processor and a memory wherein an energy usage of the data logger is monitored and adjusted using the processor and the memory using an electronic Hardware Abstraction Layer (eHAL).

The data logger system may also include a processor and a memory wherein an energy usage of the data logger is monitored and adjusted using a hypervisor.

Implementations of data logger systems may include: a data logger configured to couple to a living subject and record data related to the living subject's activities or a vital parameter of the living subject. The data logger may also include an energy storage device configured to charge wirelessly through a remote communication system or a wireless charging system. The data logger may be configured to send and receive data from the remote communication system.

Implementations of a data logger may include one, all, or any of the following:

The data logger may be implantable or ingestible.

The data logger may communicate with the remote communication system through electromagnetic signals including radio frequency, vibratory, or visible and invisible light.

The data logger may communicate with the remote communication system through acoustic signals.

The energy storage device may be a lead-acid battery, a lithium ion battery, or a lithium ion capacitor.

The data logger system may further include a processor and a memory wherein an energy usage of the data logger is monitored and adjusted using the processor and the memory using an electronic Hardware Abstraction Layer (eHAL).

Implementations of methods of transferring information wirelessly to a data logger may include: gathering data relating to a living subject's activities or a vital parameter of the living subject through a sensor included in a data logger; transferring the data from the data logger to a remote communication system using a telecommunication channel and the data logger; detecting, using a processor and a memory included in the data logger, one or more errors in the data logger. If errors are detected and correctable, then errors may be corrected using the memory and the processor. If errors are detected and not correctable, then the data logger may be deactivated and a new data logger may be relaunched.

Implementations of a method of transferring information wirelessly to a data logger may include one, all or any of the following:

Transferring the data from the subject may include extracting the data from the memory of the data logger using the remote communication system.

The method may further include updating a clock included in the data logger system from the remote communication system with a correct date and time. The clock may be used for adding a date stamp and a time stamp to the data collected from the data logger.

The method may further include issuing commands to one of the processor and the sensor of the data logger using the remote communication system; updating software associated with the data logger system using the remote communication system; and commanding a system of the implantable data logger to enter a specified mode using the remote communication system.

The method may further include monitoring and adjusting an energy usage of the data logger using a processor and a memory using an electronic Hardware Abstraction Layer (eHAL) included within the data logger.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 2 is a block diagram of an implementation of a data logger system in communication with a remote communication system;

DESCRIPTION

This disclosure, its aspects and implementations, are not limited to the specific components, assembly procedures or method elements disclosed herein. Many additional components, assembly procedures and/or method elements known in the art consistent with the intended data logger systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such data logger systems, and implementing components and methods, consistent with the intended operation and methods.

In the study of wildlife, important information can and has been collected from outside the body of the living subjects being monitored. Such data includes, by non-limiting example, location, migration patterns, mating patterns, movement patterns in habitats, and the like. Other beneficial data, including, by non-limiting example, body temperature and circadian and circannual rhythms, requires placing a monitor inside the subject. In various implementations monitors, can be surgically implantable into or ingested by the living subject. Particular implementations of implantable or ingestible monitors may allow monitoring of daily and seasonal patterns of activity, physiology, and behavior of both birds and mammals. This information has been instrumental in further understanding the wide variety of wildlife.

Various data sets already collected from data loggers/biologgers/tags have furthered the understanding of organism/environment interactions, circadian and circannual rhythms, sleep, body temperature regulation, movement and migration and habitat use.

Figure 1:
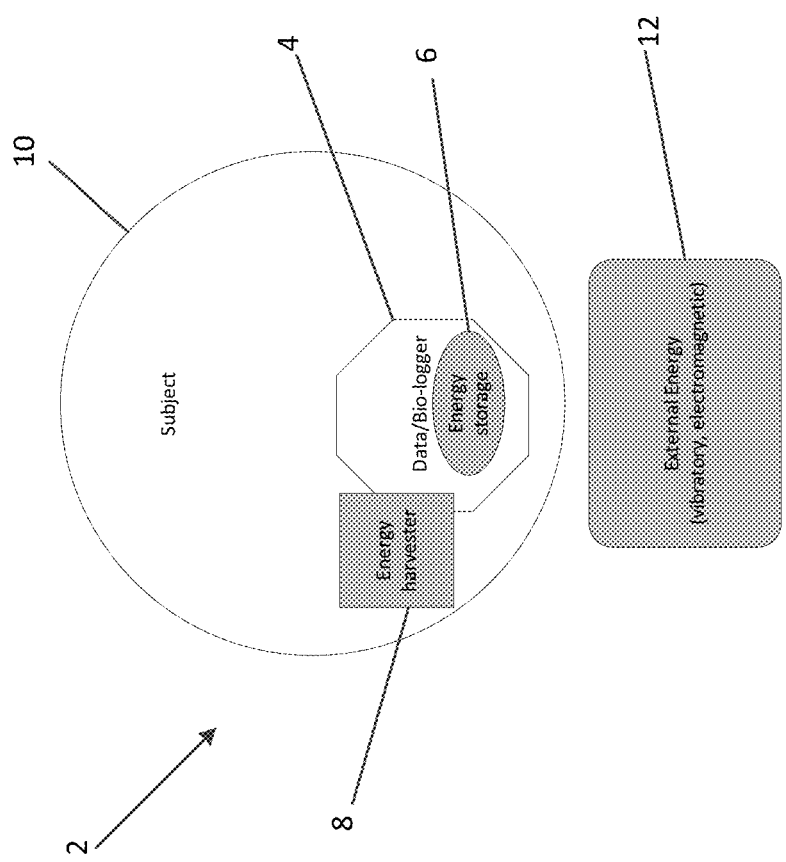
FIG. 1 is a block diagram of an implementation of a data logger system.

Referring to FIG. 1, an implementation of a data logger system 2 is illustrated. The data logger system 2 includes a data logger 4 coupled with an energy storage device 6. As will be apparent from the descriptions herein, the data logger and associated system is designed and manufactured in various sizes so that the logger can fit within a bird, fish, etc., or may be larger in the case of an elephant or whale and all sizes of animals in between. In various implementations of a data logger system, the data logger may be coupled to the outer surface of the body of living subjects. The size of the data logger may also be determined by the communication methods of the data logger and associated remote communication system. Implementations of the energy storage device 6 coupled with the data logger may include, by non-limiting example, a lead-acid battery, a lithium ion battery, and a lithium ion capacitor. The data logger is configured to couple to a living subject 8 and record data related to the living subject's 8 activities, a vital parameter of the living subject, or both the living subject's 8 activities and a vital parameter of the living subject. By non-limiting example, living subjects may include humans, sea animals, birds, land animals, and other living subjects from which may be of interest to track and log data for scientific, medical, experimental, or other study purposes. The activities of the living subject may include, by non-limiting example, migration patterns, swimming patterns where the depth of the living subject is of interest to the scientist monitoring the animal, sleeping habits, exercise/movement patterns, and the like.

The data logger may also be configured to record data related to a vital parameter of the living subject. Such vital parameters may include, body temperature, heart rate, and the like. Other implementations may be used for monitoring human patients recovering from surgeries, management of chronic illnesses, and other similar or related functions. In various implementations, the data logger may be ingestible or implantable into the living subject. The data logger may also be coupled to the outer body of the living subject as appropriate.

Implementations of data loggers disclosed herein may include any or all of the subject matter disclosed in the previously filed applications including U.S. Provisional Patent Application 61/735,363, entitled "Embedded System Energy Efficiency Optimizer" to Paul G. Flikkema, which was filed on Dec. 10, 2012; U.S. Pat. No. 9,459,685 to Paul G. Flikkema entitled "System and Methods for Optimizing Energy Efficiency in Programmable Devices"; and U.S. Utility Patent Application to Paul G. Flikkema entitled "System And Methods For Optimizing Energy Efficiency In Programmable Devices," application Ser. No. 15/284,439, filed Oct. 3, 2016, now pending, the disclosures of each of which are hereby incorporated entirely herein by reference.

As illustrated in FIG. 1, the data logger system 2 also includes an energy harvester 8. The energy harvester 8 is electrically coupled with the energy storage device. The energy harvester 8 is configured to harvest energy from an external environment 12 of the living subject, the living subject 10, or both the external environment 12 and the living subject 10. The energy harvester may be able to harvest energy from vibratory power transfer, electromagnetic fields, pressure differences, or any combination thereof. The harvester may do this by harvesting any of this energy from the external environment of the living subject, the living subject itself, or both the external environment and the living subject. As a non-limiting example, an energy harvester system that can harvest energy from the external environment through pressure changes is described in U.S. Non-Provisional patent application Ser. No. 15/173,540, entitled "Energy Harvester for Wildlife Monitor" to Michael Shafer et al. which was filed on Jun. 3, 2016, the entirety of which is hereby incorporated entirely herein by reference. In various implementations, the energy harvester may be a piezoelectric resonator.

Another implementation of a data logger system may include a data logger configured to couple to a living subject and an energy storage device configured to charge wirelessly through a remote communication system or a wireless charging system. The energy storage device may be configured to charge through various methods including, by non-limiting example, proximity chargers, inductive coupling of two different loops, solar power, or any combination thereof.

As previously described examples of living subjects may include humans, sea animals, birds, land animals, and other living subjects from which may be of interest to track and log data for scientific, medical, experimental, or other study purposes. The data logger may be configured to record data related to the living subject's activities or a vital parameter of the living subject. The activities of the living subject to be recorded may include migration patterns, swimming patterns where the depth of the living subject is of interest to the scientist monitoring the animal, sleeping habits, exercise/movement patterns, and any other activity disclosed in this document. The data logger may also be configured to record data related to a vital parameter of the living subject wherein such vital parameters may include, by non-limiting example, body temperature, heart rate, blood oxygen level, hormone level, and any other parameter used to describe the activity or state of the living subject.

Implementations of the data logger may also be configured to send and receive data from the remote communication systems. Methods for sending and receiving the data may include those previously described herein such as through electromagnetic signals, acoustic signals, and other methods of remote communication. Examples of electromagnetic signals may include radio frequency, vibratory, visible and invisible light, and any combination thereof.

Referring to FIG. 2, the data logger 14 is configured to communicate with a remote communication system 16. This system may allow for two-way communication between the data logger and the remote communication system. Two-way communication between a data logger system and an external/remote communication system would allow for data retrieval as well as updating the bio logger/data logger system when it is in use in the subject. This two-way communication would allow the latest technology (via software and/or firmware updates) to be employed even on data loggers that have been deployed for many years.

The feature of two-way communication allows the data to be offloaded to an external receiver/remote communication system without the removal of the data logger from the living subject. Remote extraction of data would allow researchers to collect data in real time rather than having to wait weeks, months or years to analyze the data. The method of transfer could include electromagnetic signals, such as by non-limiting example, radio communication, vibratory, visible and invisible light for subdermal implants, and any combination thereof. Other telecommunication methods may also be used such as acoustic signals. In various implementations, very high frequency (VHF) radio may also be used for communication between the data logger and the remote communication system.

This communication system would also allow researchers to more easily detect issues in the software or general system of the data logger. Because of the two-way communication, the researchers would be able to transfer information to the data logger to fix any identified operational, system, or programming problems. The ability to detect and/or fix problems would save researchers valuable time and resources. If the errors in the system are not correctable, the researchers may be able to deactivate and relaunch or schedule a relaunch of a new data logger rather than waiting significant periods of time to find out in the end that no data was actually being collected. Relaunching of a new data logger may include tracking a living subject using the currently installed data logger, retrieving the living subject from its determined location, removing the current data logger and installing a new data logger. In other implementations, relaunching a new data logger may include stopping monitoring of the current living subject and finding a new living subject in which to install a new data logger wherein the previous data logger may detach or naturally be expelled from the current living subject. If the living subject is a human, the researchers and/or doctors may notify the person to come into an office in order for the original data logger to be repaired or removed and replaced.

Other capabilities enabled by two-way communication between a remote communication module and an implementation of a data logger include, but are not limited to, updating the clock time of the data logger system, issuing commands to the data logger, updating the data logger system software and firmware, and commanding the system to enter a specified mode(s). The clock time of the data logger system includes the time-stamping function of the data recorder in order to give experimenters the precise time when a monitored activity of the living subject occurred. Time stamping is particularly important when the data to be collection is determined by time such as, by non-limiting example, circadian rhythms, sleep patterns, and the like. Non-limiting examples of commands to be sent to the data logger remotely include: updates to measurement types, changes to sampling rates and actuation events such as, by non-limiting example, drug delivery, electrical stimulus, chemical stimulus, and the like. In some implementations, researchers may decide to change what data is being collected based on previous data or an unrelated change in research priorities. Examples of system states or modes may include, by non-limiting example, a hibernation state to conserve energy when measurements are not needed, a data collection state for normal operation, and a data retrieval state for extraction of data collected.

Specifically a method of transferring information wirelessly to a data logger may include gathering data relating to one of a living subject's activities and a vital parameter of the living subject through a sensor included in the data logger. The data may then be transferred from the data logger to a remote communication system 16 using a telecommunication channel and the data logger 14. As previously described the method may also include detecting one or more errors in the data logger using a processor and a memory included in the data logger. If errors are detected and correctable, then the method may include correcting the errors using the memory and the processor. If errors are detected and are not correctable, the method may include deactivating the data logger and relaunching a new data logger. Relaunching a new data logger may include one of the methods described herein or another method that would allow experimenters to continue tracking a living subject after a non-correctable error is detected, including activating a back up or secondary data logger already attached to the subject.

Transferring the data from the subject may include extracting data from the memory of the data logger 14 using the remote communication system 16. Extracting the data may include manual retrieval of data from the data logger when determined to be appropriate by the experimenters. Extracting data may also include automatic retrieval of data from the data logger at predetermined intervals where the intervals are determined by the experimenters. The remote communication system may also extract the data from the data logger when the data logger is in range. For example, the remote communication system may not be able to communicate with the data logger at deep depths of the ocean where some living subjects dwell. In such a case, the remote communication system would extract data from the data logger when the living subject resurfaces completely or comes into an acceptable/predetermined depth range. In such a situation, the remote communication system may send out signals at predetermined times searching for the data logger coupled with a living subject. Transferring the data from the subject may also include a processor in the data logger searching for and initiating communication with the remote communication system at predetermined times.

Figure 3:
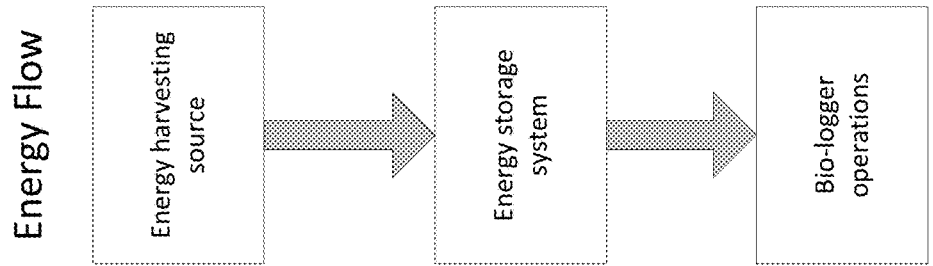
FIG. 3 is a block diagram of an implementation of an energy flow within an implementation of a data logger system.

To efficiently use the energy available to the system, various implementations of data loggers may be constructed to take into account a plan of its activities, the energy used for these activities, and a model for prediction of harvested energy. To optimally use the energy available, an energy-cognizant advanced implantable device must plan/anticipate and prioritize the flow of energy. Referring to FIG. 3, an example of an energy flow plan is illustrated. The plan may include, by non-limiting example, the energy provided from the energy-harvesting source to the data logger; energy transferred from the energy harvesting source to storage; and the energy supplied from the storage to the data logger. The planned energy flows may be optimized under several constraints (which may be included in a model of energy use of the data logger in particular implementations) to maximize a specific set of objectives that are determined by the experimenter, such as, by non-limiting example, the energy capacity of the storage, the amount of data to be logged, the transmitting power needed to transmit data, or any other constraint used by the model/experimental. The data logger may execute the planned energy flows and may also be capable of improving its energy usage over time through modifying the model(s) used. The execution of the planned flows may involve the data logger manipulating a set of switches and regulators. Construction and refinement of the model may require that the data logger monitor several flows as well as the state of its energy harvesting and storage subsystem.

Figure 4:
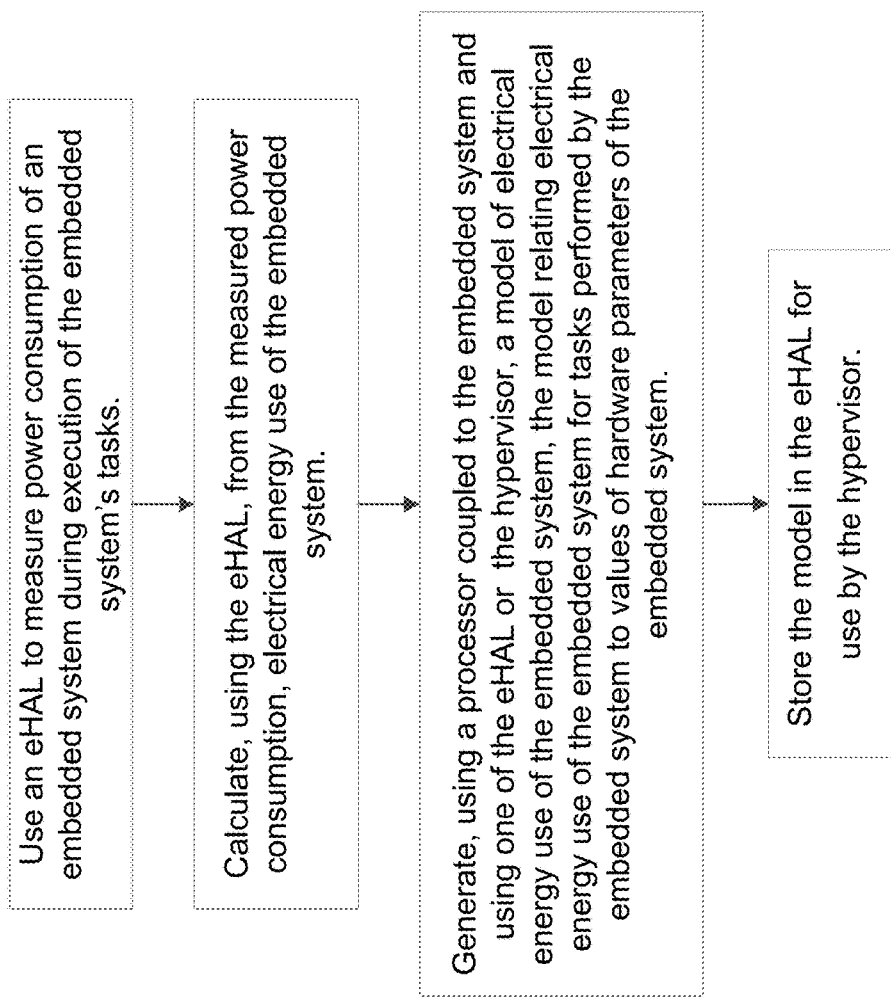
FIG. 4 is a flow chart of an implementation of eHAL software in monitoring energy usage of an implementation of a data logger, the eHAL software is run on an implementation of a processor and a memory inside an implementation of a data logger.
Figure 5:
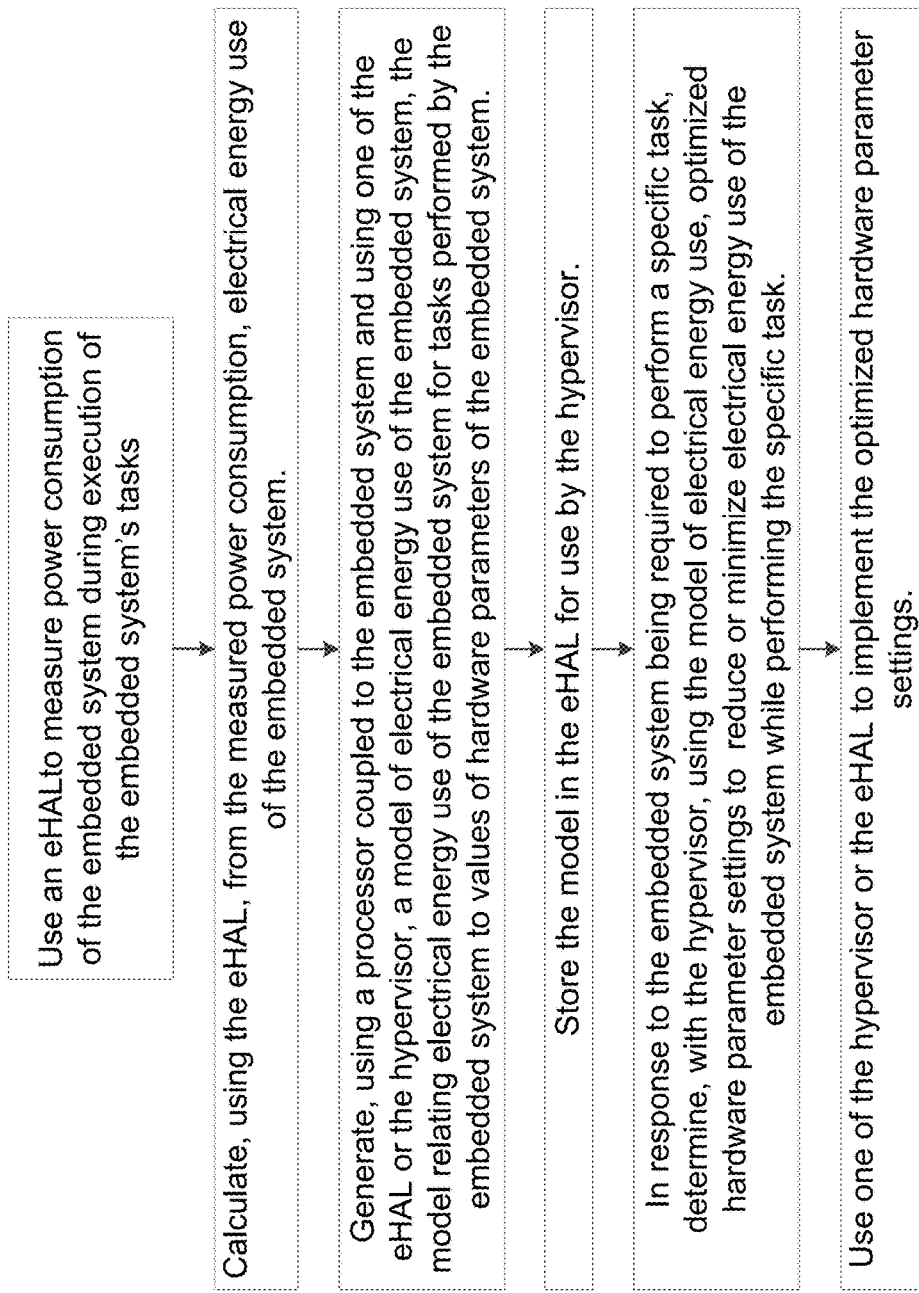
FIG. 5 is another flow chart of an implementation of eHAL software in a monitoring energy usage of an implementation of a data logger, the eHAL software is run on an implementation of a processor and a memory inside an implementation of a data logger.

In various implementations, the data logger system may include a processor and a memory wherein the energy usage of the data logger is monitored and adjusted through the use of the processor and the memory in combination of an electronic Hardware Abstraction Layer (eHAL). Referring to FIGS. 4 and 5, an example of flowcharts of various method implementations used by implementations of systems designed to manage energy efficiently is illustrated. The system may include a hardware abstraction layer (HAL), an eHAL, a hypervisor, and various models including hardware parameters for the specific data loggers using systems and methods disclosed in any of the previous patent applications and patents previously incorporated by reference herein.

As illustrated in FIG. 4, the method implementation may include using an eHAL to measure the power consumption of an embedded system (including the processor and the memory of data logger) during execution of the embedded system's tasks. The method may also include calculating, using the eHAL, from the measured power consumption, electrical energy use of the embedded system. The method may include generating, using a processor coupled with the embedded system and using the eHAL or the hypervisor, a model of electrical energy use of the embedded system where the model relates energy use of the embedded system for tasks performed by the embedded system to values of hardware parameters of the embedded system. The method may also include storing the model in the eHAL for use by the hypervisor.

Referring to FIG. 5, another method implementation may include using an eHAL to measure power consumption of the embedded system during execution of the embedded data logger system's tasks, and calculating, using the eHAL, from the measured power consumption, electrical energy use of the embedded system. The method may also include generating, using a processor coupled with the embedded system and using the eHAL or the hypervisor, a model of electrical energy use of the embedded system where the model relates electrical energy use of the embedded system for tasks performed by the embedded system to values of hardware parameters of the embedded system. The method may include storing the model in the eHAL for use by the hypervisor. In response to the embedded system being required to perform a specific task, the method may further include determining, with the hypervisor, using the model of electrical energy use, optimized hardware parameter settings to reduce or minimize electrical energy use of the embedded system while performing the specific task. The method may also include using the hypervisor or the eHAL to implement the optimized hardware parameter settings.

In places where the description above refers to particular implementations of data loggers and implementing components, sub-components, methods and sub-methods, it should be readily apparent that a number of modifications may be made without departing from the spirit thereof and that these implementations, implementing components, sub-components, methods and sub-methods may be applied to other data loggers.

What is claimed is:

1. A data logger system comprising:
   a data logger coupled with an energy storage device, the data logger configured to couple to a living subject and record data related to one of the living subject's activities and related to a vital parameter of the living subject;
   an energy harvester electrically coupled with the energy storage device, where the energy harvester is configured to harvest energy from one of an external environment, the living subject, and both the external environment and the living subject; and
   a processor and a memory;
   wherein the data logger is configured to communicate with a remote communication system while coupled to the living subject;
   wherein an energy usage of the data logger is monitored and adjusted using the processor and the memory using an electronic Hardware Abstraction Layer (eHAL);
   wherein the eHAL is directly coupled to and configured to directly alter hardware settings or alter the hardware settings through a hypervisor.

2. The data logger of claim 1, wherein the data logger is one of implantable and ingestible.

3. The data logger system of claim 1, wherein the data logger communicates with the remote communication system through electromagnetic signals comprising one of radio communication, vibratory, visible light, and invisible light.

4. The data logger system of claim 1, wherein the energy harvester harvests the energy from one of electromagnetic fields, pressure differences, and vibratory power transfer.

5. The data logger system of claim 1, wherein the energy harvester is a piezoelectric resonator.

6. The data logger system of claim 1, wherein the energy storage device is one of a lead-acid battery, a lithium ion battery, and a lithium ion capacitor.

7. The data logger system of claim 1, wherein the energy usage of the data logger is monitored and adjusted using the hypervisor.

8. A data logger system comprising:
   a data logger configured to couple to a living subject and record data related to one of the living subject's activities and a vital parameter of the living subject; and
   an energy storage device configured to charge wirelessly through one of a remote communication system and a wireless charging system;
   a processor and a memory;
   wherein the data logger is configured to send and receive the data from the remote communication system while coupled to the living subject; and
   wherein an energy usage of the data logger is monitored and adjusted using the processor and the memory using an electronic Hardware Abstraction Layer (eHAL);
   wherein the eHAL is directly coupled to and configured to directly alter hardware settings or alter the hardware settings through a hypervisor.

9. The data logger of claim 8, wherein the data logger is one of implantable and ingestible.

10. The data logger system of claim 8, wherein the data logger communicates with the remote communication system through electromagnetic signals comprising one of radio frequency, vibratory, and visible and invisible light.

11. The data logger system of claim 8, wherein the energy storage device is one of a lead-acid battery, a lithium ion battery, and a lithium ion capacitor.

12. The data logger system of claim 8, wherein the energy usage of the data logger is monitored and adjusted using the hypervisor.

13. A method of transferring information wirelessly to a data logger, the method comprising:
   gathering data relating to one of a living subject's activities and a vital parameter of the living subject through a sensor comprised in the data logger, the data logger configured to be coupled to the living subject;
   transferring the data relating to the living subject from the data logger to a remote communication system using a telecommunication channel and the data logger;
   detecting using a processor and a memory comprised in the data logger one or more errors in the data logger;
   if the one or more errors are detected and correctable, then correcting the one or more errors using the memory and the processor;
   if the one or more errors are detected and not correctable, then deactivating the data logger; wherein the one or more errors in the data logger are detected and corrected using the processor and the memory using an electronic Hardware Abstraction Layer (eHAL);
   wherein the eHAL is directly coupled to and configured to directly alter hardware settings or alter the hardware settings through a hypervisor.

14. The method of claim 13, wherein said transferring the data relating to the living subject comprises extracting the data from the memory of the data logger using the remote communication system.

15. The method of claim 13, further comprising updating a clock comprised in the data logger from the remote communication system with a correct date and time, the clock comprised to add a date stamp and a time stamp to the data relating to the living subject collected from the data logger.

16. The method of claim 13, further comprising:
   issuing commands to one of the processor and the sensor of the data logger using the remote communication system;
   updating software associated with the data logger using the remote communication system; and
   commanding a system of the data logger to enter a specified mode using the remote communication system.

* * * * *